United States Patent [19]

Flasck et al.

[11] Patent Number: 4,842,378
[45] Date of Patent: Jun. 27, 1989

[54] METHOD OF ILLUMINATING FLAT PANEL DISPLAYS TO PROVIDE CRT APPEARING DISPLAYS

[75] Inventors: Richard A. Flasck, San Ramon; Benny Irwin, San Jose; Scott H. Holmberg, San Ramon, all of Calif.

[73] Assignee: Alphasil, Inc., Fremont, Calif.

[21] Appl. No.: 35,515

[22] Filed: Apr. 7, 1987

[51] Int. Cl.[4] ............... G02F 1/13; F21V 7/04; F21L 19/00; F21P 1/00
[52] U.S. Cl. .................. 350/345; 350/331 R; 362/31; 362/178; 362/252; 362/253; 362/310; 362/355; 364/708
[58] Field of Search ........... 350/345, 331 R; 362/71, 362/87, 84, 104, 178, 252, 253, 323, 434, 32, 310, 347, 343, 355; 364/708

[56] References Cited

U.S. PATENT DOCUMENTS

| 1,680,633 | 8/1928 | Peters . | |
|---|---|---|---|
| 4,497,036 | 1/1985 | Dunn | 364/708 |
| 4,664,481 | 5/1987 | Ito et al. | 350/345 |

FOREIGN PATENT DOCUMENTS 1160345 10/1961 Fed. Rep. of Germany ...... 362/253

OTHER PUBLICATIONS

IBM Corp., "Removable Liquid Crystal Display for a Personal Computer", IBM Technical Disclosure Bulletin, vol. 29, No. 10, Mar. 1987.

Primary Examiner—Stanley D. Miller
Assistant Examiner—Huy Kim Mai
Attorney, Agent, or Firm—Silverman, Cass, Singer & Winburn, Ltd.

[57] ABSTRACT

LCD screen illumination is provided by a neon tube formed to fit closely adjacent the screen. A tube formed to fit around the periphery of the screen shielded from the viewer's eyes can be utilized to front light the screen. A serpentine shaped tube can be placed adjacent the back of the screen to back light the screen. The tube can be formed to have a size coextensive with the screen configuration and can have a light diffuser between the tube and the screen to provide uniform illumination. The tube can provide any desired color, an adjustable high maximum surface brightness, high electrical efficiency and a narrow profile.

10 Claims, 2 Drawing Sheets

METHOD OF ILLUMINATING FLAT PANEL DISPLAYS TO PROVIDE CRT APPEARING DISPLAYS

BACKGROUND OF THE INVENTION

The present invention pertains to improved methods of illuminating flat panel displays and displays incorporating the improved illumination. More particularly, the present invention is directed to methods of illuminating flat panel displays to provide displays having the appearance of CRT's.

In recent years there has been growing interest in flat panel displays, such as those which employ liquid crystals, electrochromic or electroluminescence, as replacements for conventional cathode ray tubes (CRT). The flat panel displays promise lighter weight, less bulk and substantially lower power consumption than CRT's. Also, as a consequence of their mode of operation, CRT's nearly always suffer from some distortion. The CRT functions by projecting an electron beam onto a phosphor-coated screen. The beam will cause the spot on which it is focused to glow with an intensity proportional to the intensity of the beam. The display is created by the constantly moving beam causing different spots on the screen to glow with different intensities. Because the electron beam travels a further distance from its stationary source to the edge of the screen than it does to the middle, the beam strikes various points on the screen at different angles with resulting variation in spot size and shape (i.e. distortion).

Flat panel displays are manufactured to be substantially free of such distortion. In the manufacture of flat panel displays the circuit elements are deposited and patterned, generally by photolithography, on a substrate, such as glass. The elements are deposited and etched in stages to build a device having a matrix of perpendicular rows and columns of circuit control lines with a pixel contact and control element between the control line rows and columns. The pixel contact has a medium thereon which is a substance that either glows (active) or changes its response to ambient light (passive) when a threshold voltage is applied across the medium control element. The medium can be a liquid crystal, electroluminescent or electrochromic materials such as zinc sulfide, a gas plasma of, for example, neon and argon, a dichroic dye, or such other appropriate material or device as will luminesce or otherwise change optical properties in response to the application of voltage thereto. Light is generated or other optical changes occur in the medium in response to the proper voltage applied thereto. Each optically active medium is generally referred to as a picture element or "pixel".

The circuitry for a flat panel display is generally designed such that the flat panel timeshares, or multiplexes, digital circuits to feed signals to one row and column control line of the pixels at a time. Generally one driving circuit is used for each row or column control line. In this way a subthreshold voltage can be fed to an entire row containing hundreds of thousands of pixels, keeping them all dark or inactive. Then a small additional voltage can be supplied selectively to particular columns to cause selected pixels to light up or change optical properties. The pixels can be made to glow brighter by applying a larger voltage or current of a longer pulse of voltage or current. Utilizing liquid crystal displays (LCD's) with twisted nematic active material, the display is substantially transparent when not activated and becomes light absorbing when activated. Thus, the image is created on the display by sequentially activating the pixels, row by row, across the display. The geometric distortion described above with respect to CRT's is not a factor in flat panel displays since each pixel location is defined in the manufacturing process.

One of the major problems that arises with respect to the prior art method of manufacture of backplanes for active matrix displays (e.g. those employing thin film transistors at each pixel) is that they generally suffer production yield problems similar to those of integrated circuits. That is, the yields of backplanes produced are generally not 100% and the yield (percentage of backplanes with no defects) can be 0% in a worst case. High quality displays will not tolerate any defective pixel transistors or other components. Also, larger size displays are generally more desirable than smaller size displays. Thus, a manufacturer is faced with the dilemma of preferring to manufacture larger displays, but having to discard the entire product if even one pixel is defective. In other words, the manufacturer suffers a radically increased manufacturing cost per unit resulting from decreasing usable product yield.

Active matrix displays can be formed which substantially eliminate these manufacturing problems by utilizing the methods, transistors and displays which are disclosed by U.S. Pat. No. 4,651,185, issued Mar. 17, 1987, entitled "Method of Manufacturing Thin Film Transistors and Transistors Made Thereby"; U.S. Ser. No. 493,523, filed May 11, 1983, entitled "Method of Manufacturing Flat Panel Backplanes, Display Transistors and Displays Made Thereby"; and U.S. Ser. No. 948,224, filed Dec., 31, 1986, entitled "Method of Manufacturing Flat Panel Backplanes Including Improved Testing and Yields Thereof and Displays Made Thereby", in the names of Scott H. Holmberg and Richard A. Flasck, each assigned to the assignee of the present application, which are incorporated herein by reference.

Notwithstanding the higher resolution and contrast which can be obtained by utilizing active matrix displays, the flat panel displays utilizing multiplexing or active matrix display techniques still do not provide sufficient viewer readability to be fully acceptable.

It would be highly desirable to provide a CRT appearing flat panel display to provide full viewer acceptance of flat panel displays, such as utilized in portable computers. Some so-called transportable computers utilize a CRT screen for their displays. These screens typically produce about 40 Foot Lamberts (FL) of light at the screen. Viewers acceptance is high for CRT screens, which typically utilize a black background with green, amber or white glowing letters.

One prior art attempt at providing flat panel display illumination utilizes electroluminescent (EL) sheets to back light the flat panel displays. Most LCD portable personal computer (PC) screens, such as IBM's Convertible PC, are reflective in character and utilize black or dark gray characters on a light gray background. Other LCD screens utilize black characters on silver or white backgrounds and some utilize light characters on dark backgrounds. A typical LCD screen does not glow, such as the Convertible PC, and therefore has no FL's of light at the screen without the reflected ambient light. Backlighting is therefore necessary to achieve any reasonable readability under low ambient light conditions. High ambient light conditions, such as bright sunlight, also can cause the back lighted LCD screens to have poor readability because the light reflected from the front surface of the screens substantially eliminates the contrast of the characters.

EL lighting devices include a sheet of powder which substantially uniformly glows across the sheet. The sheets have a very thin profile which is advantageous for back lighting, but the EL devices have low electrical efficiency and a low maximum sheet brightness on the order of 5 to 25 FL. If the power applied is increased beyond a threshold level, the EL devices saturate without increasing the surface brightness. Typically the EL devices produce a maximum screen brightness of about 5–10 FL. The low efficiency causes a battery power drain for portable PC's and the low maximum screen brightness causes poor sunlight readability.

A second suggested prior art solution to the LCD screen lighting problem is the use of small fluorescent tubes. Fluorescent tubes have high electrical efficiency, five to ten times greater than EL sheets, and high maximum surface brightness. The fluorescent tubes typically have large profiles, uniform lighting and high voltage requirements. These and other problems of the fluorescent tube approach are discussed in further detail with respect to FIG. 2 of the present application.

The above problems are substantially eliminated in the present invention by providing methods of illuminating LCD screens to provide substantially CRT readability of the LCD screens.

SUMMARY OF THE INVENTION

There is provided improved methods of illuminating flat panel display screens to provide LCD screens with substantially CRT readability.

The improvements are accomplished by lighting the LCD screens with a neon tube formed to fit closely adjacent to the screen. The neon tube provides a high electrical efficiency light source having a narrow profile and an adjustable high maximum surface brightness. The tube can provide any desired color to provide a CRT appearing LCD screen.

The screens can be front lighted by placing a tube formed to fit around the periphery thereof on or adjacent the top surface of the screen. The tube is shielded from the viewer's eyes. The screens can be back lighted by placing a tube formed into a serpentine shape coextensive with the screen configuration and placed behind the screen. A light diffuser can be placed between the tube and the screen to provide uniform screen illumination.

DESCRIPTION OF THE PREFERRED EMBODIMENTS

Figure 1:
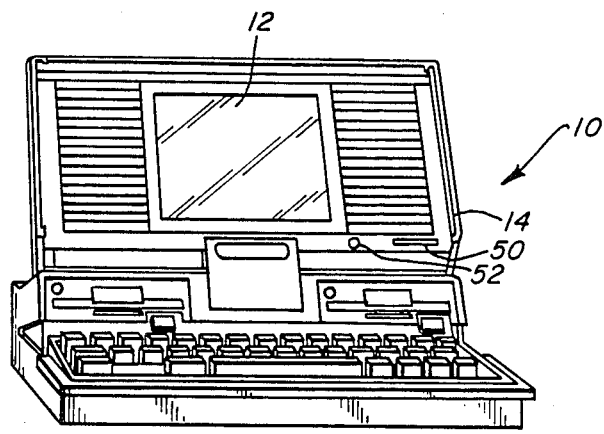
FIG. 1 is a perspective view of a portable computer which can utilize the LCD illumination of the invention.

Referring to FIG. 1, there is shown a portable personal computer (PC) 10, which can incorporate the illumination techniques of the present invention. The PC 10 is an IBM Convertible PC, which includes an LCD screen 12 mounted in a lid or top 14 of the PC 10. The LCD screen 12 of the PC 10 is a reflective multiplexed LCD with no back lighting. The screen 12 has black or dark gray characters on a light gray background with no glowing of the background or the characters displayed. The battery supplied with this PC and other conventional PC's typically will operate the PC 10 for about eight hours before recharging. The lowest acceptable operating time before recharging is about five hours. The contrast ratio of the reflective screen 12 is about 3 to 1. A viewer acceptance level is about 8 to 1 which is about that of a CRT which has a contrast ratio of about 10 to 1. The screen 12 is difficult, if not impossible, to read in low ambient light conditions. An attempt to decrease reflectivity was made by providing an antireflective coated glass over the screen 12, which cuts the reflectivity down from about 4% to about 2%. All the reflectivity, however, is specular or mirror-like, as opposed to diffused, and hence still can provide a significant viewability problem.

Figure 2:
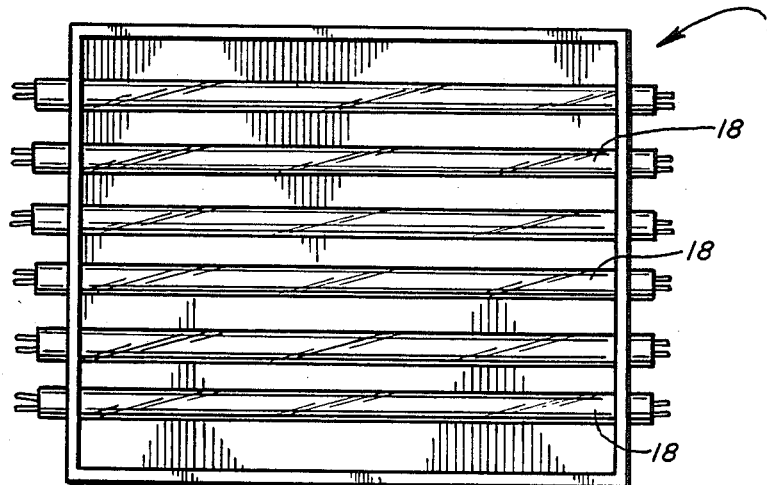
FIG. 2 is a plan view of a prior art array of fluorescent tubes for back lighting an LCD screen.

One suggestion to increase the viewability of LCD screens, such as the screen 12 is to utilize a prior art fluorescent back lighting array 16 as illustrated in FIG. 2. A plurality of mini-fluorescent tubes 18, here illustrated as six in number, are mounted in a frame 20. At least one manufacturer, Stanley Electric Co., Ltd. of Tokyo, Japan distributed through JKL Components Corporation of Pacoima, Calif., is producing the tubes 18 for back lighting LCD devices. For example purposes, the frame 20 will be described for utilization with a rectangular 4 inch by 5 inch LCD screen.

Generally fluorescent tubes have a large profile, about one to two inches in diameter. The mini-tubes are considerably smaller in diameter and can be less than one-half inch. The tubes 18 must be connected in series. The sustaining voltage of each tube must be added when the tubes are connected in series. For the 4 inch by 5 inch display frame 20 illustrated, six tubes 18 are utilized with a diffuser plate (not illustrated). The voltage required becomes prohibitive, especially for a portable PC, because each of the mini-fluorescent tubes has a voltage drop of about 250 volts. Therefore, the array 16 requires an expensive high efficiency, compact power supply to supply the 1500 or more volts necessary to sustain the tubes.

The tubes 18 cannot be driven in a series-parallel or parallel arrangement, since as soon as the first tube is activated or fires, an insufficient voltage results to fire the remaining tubes. To provide a separate power supply for each of the tubes 18 is not practical from a cost, weight and uniformity perspective, since the identical current should flow in each tube to provide equal brightness.

A custom power supply to supply the 1500 volts for the six tube array 16 would cost about $50.00 in volume. Likewise, the tubes from JKL cost about $3.00 each in volume resulting in an overall cost of about $68.00. Further, utilizing the six tubes requires about a 0.25 inch space between the tubes and the diffuser plate to provide uniform illumination. Otherwise the tube profile will show through the plate or will produce a brighter spot on the plate. An increase in the number of tubes could eliminate the 0.25 inch space, but would require a prohibitive amount of voltage. Further, the fluorescent tubes 18 have an intensity drop at the edge of the tubes and hence are not a totally uniform light source.

Figure 3:
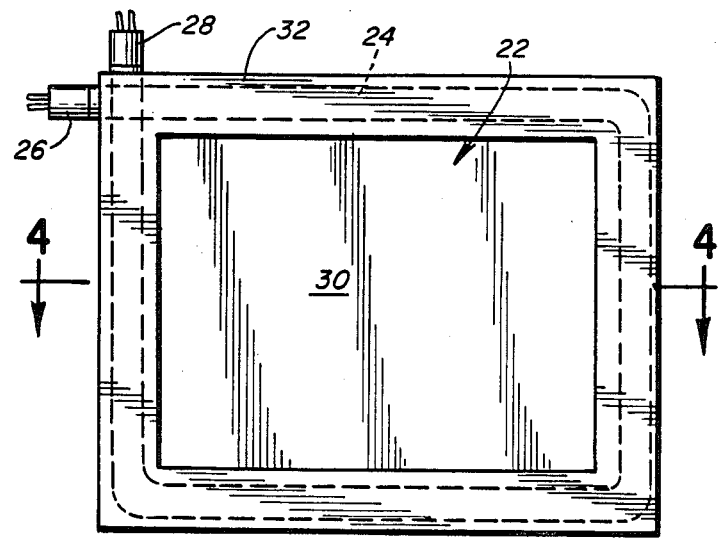
FIG. 3 is a top plan view of one embodiment of the present invention for front lighting an LCD screen.
Figure 4:
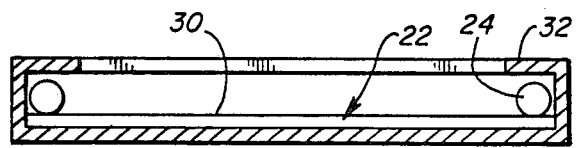
FIG. 4 is a side sectional view of the embodiment of FIG. 3, taken along the line 4—4 therein.

A first embodiment of an LCD screen 22 incorporating the illumination of the present invention is illustrated in FIGS. 3 and 4. The screen 22 is front lighted by a substantially conventional neon tube 24, which has an anode 26 and a cathode 28 for attaching to an appropriate power supply (not illustrated). The tube 24 is bent or formed into a substantially rectangular shape which then is placed on or adjacent a front surface 30 of the screen 22. A bezel or covering 32 is formed or attached to the screen 22 or the unit into which the screen is mounted, such as the PC 10, to protect the viewer's eyes from direct exposure to the light from the activated tube 24. The light from the tube 24 is then directed across the front of the screen 22.

Figure 5:
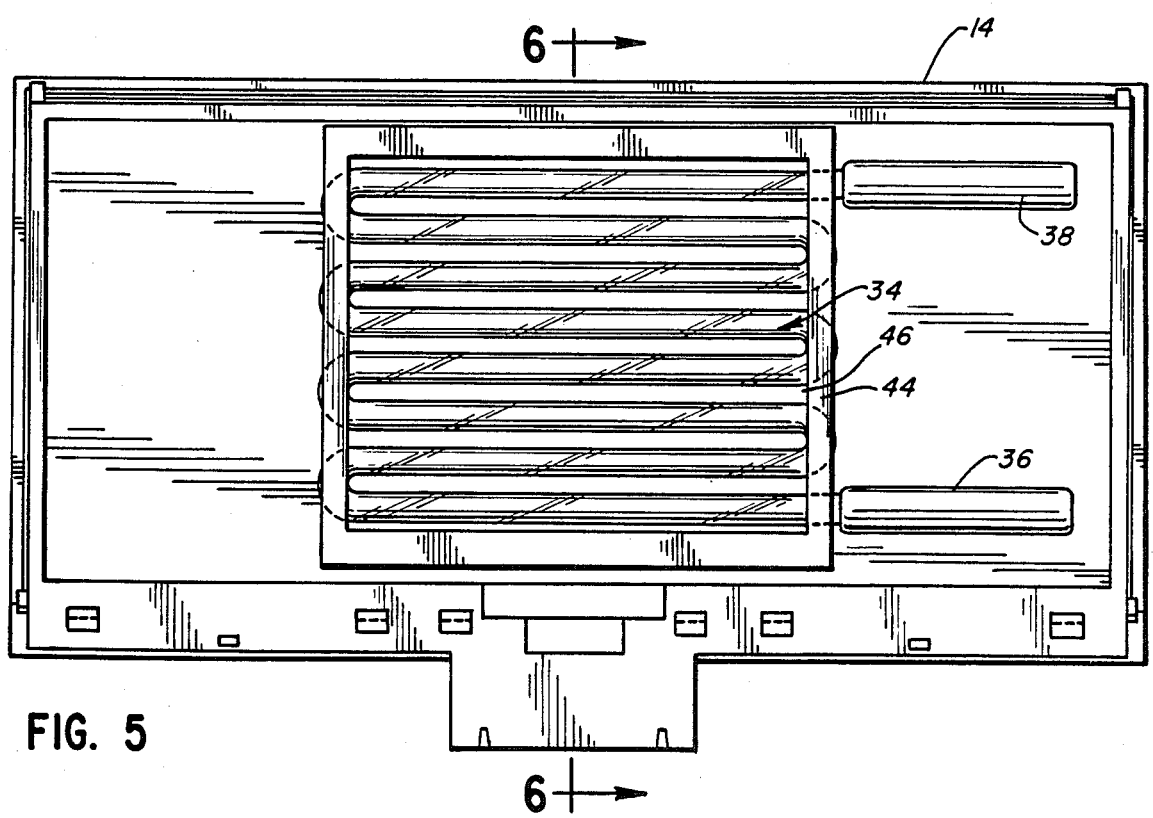
FIG. 5 is a top plan view of a second embodiment of the present invention for back lighting an LCD screen mounted in the top unit or lid of the personal computer illustrated in FIG. 1.
Figure 6:
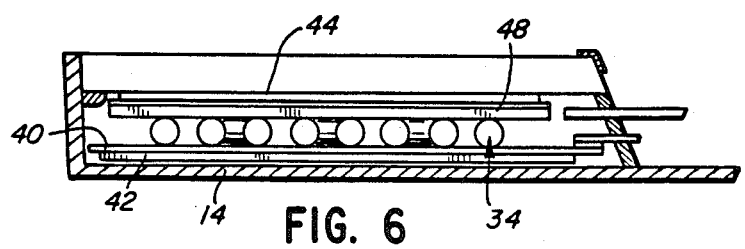
FIG. 6 is a side sectional view of the embodiment of FIG. 5 taken along the line 6—6 therein, with associated components.

A second embodiment of a neon tube 34, which incorporates the illumination method of the present invention is illustrated in FIGS. 5 and 6. Th tube 34 is formed into a serpentine shape and has an anode 36 and a cathode 38 and is illustrated as being mounted into the lid 14 of the PC 10. A power supply (not illustrated) can be mounted in the lid, where desired, such as between the anode 36 and the cathode 38.

The tube 34 preferably is mounted onto an insulating sheet 40 having a conductive coating which provides a ground plane between the tube 34 and a printed circuit board 42 for driving the LCD screen. A suitable sheet 40 can be formed by a coating of copper on a Kapton sheet. The tube 34 preferably is formed into a size substantially the same as the configuration of an LCD screen 44 utilized therewith. The parallel portions of the tube 34 are configured to match the configuration of an active area 46 of the LCD screen 44. A diffuser plate 48 preferably is provided between the LCD screen 44 and the tube 34 to ensure even illumination of the screen 44. One effective diffuser plate can be formed from a Plexiglass acrylic sheet, one-eighth inch thick, sold under the number W-2447 by Rohm and Haas Company of Philadelphia, Pa.

Fluorescent tubes generally are available only as straight tubes or in custom sheets formed by utilizing expensive tooling. The sustaining voltage of the neon or the fluorescent tubes is roughly proportional to the square root of the length of the tube for a given tube diameter. The closely spaced right leg serpentine neon tube 34 can be formed of a diameter of only about 0.25 inch. The sustaining voltage is about 800 volts which allows a very inexpensive power supply to be utilized, such as provided by Endicott Research Group, Inc. of Endicott, N.Y. Again, in volume, the neon tube 34 will cost about $18.00 and the power supply about $7.00 in quantity for a total cost of about $25.00 versus the $68.00 cost for the fluorescent array 16. Also, the weight of the neon tube 34 and power supply will be about one-half of the weight of the array 16.

The neon tube can be filled or charged with any conventional medium, such as neon or argon or a combination of the two. Two manufacturers of suitable neon tubes, generally in four foot lengths, are EGL and VOLTARC which are distributed by Interstate Electric Co. of Commerce, Calif. For portable PC applications, the tube 34 preferably is driven by an alternating current of about one milliamp with a peak voltage of about 700 to 800 volts at a frequency of 10-20 Khz. The tube 34 can be driven with a substantially greater current, for example twenty milliamps, to achieve a very intense light source, such as for direct sunlight readability.

Further, the neon tube 34 can be bent in a very tight radius and in various complex shapes with standard techniques. The tube 34 is as efficient as the fluorescent tubes, which makes it about 7 to 30 times as efficient as the EL sheets depending upon the light output. The tube 34 is about 7 times as efficient at a low light output and about 30 times as efficient at a high light output. The close spacing between the legs of the tube 34 allows the diffuser 48 to be placed directly or almost directly onto the tube 34 while still providing uniform lighting.

As a still further advantage, the neon tube 34 can be supplied in any desired color which then achieves the desired CRT readability, since the background can be a nonglowing black and the characters can be any glowing color desired, such as blue, green, red, amber, orange, etc. One preferable combination is a white neon tube and utilizing conventional color filters with the LCD screen, to achieve a full color display.

The tube 34 utilizes more power than the PC 10 without the illumination provided by the invention, however, the standard eight hour battery will still provide about five and one-half hours of operation with the tube 34 activated.

The contrast ratio of LCD screens, when provided with the illumination of the invention, is increased beyond the acceptable level of about 8 to 1. The contrast ratio utilizing the invention is from about 12 to 1 to about 40 to 1 which is considerably better than that of CRT's. This LCD screen contrast ratio is provided by utilizing the active matrix transistors and displays disclosed in the above-referenced and incorporated U.S. Pat. No. 4,651,185 and U.S. application Ser. No. 493,523. This provides an LCD screen which achieves the readability of CRT screens with a low cost, thin profile and a lower power consumption than CRT's. This LCD screen can be utilized to retrofit PC's such as the PC 10 to eliminate the numerous problems caused by low or high ambient light levels.

The reflectivity problem easily is solved by utilizing antiglare glass over the screen 44. This glass is formed by being sandblasted or otherwise chemically treated to provide a slightly roughened surface to eliminate specular reflection. The same amount of diffuse reflection does not seem to be objectionable to the viewer.

In utilizing the screen 44 with the tube 34 in the PC 10, it can be desirable to save the battery life. If the ambient light is sufficient, especially utilizing the improved active matrix displays incorporated by reference, the tube 34 can be turned off. Referring to FIG. 1, this can be accomplished by a slide switch 50. The video then would display white (gray) characters on a black background. To switch this to a conventional looking reflective display, the video can be reversed by a button 52 to achieve black (gray) characters on a white background.

The tube 34 with a power applied of about 1.5 watts does not present any heat problems and produces a screen brightness of about 150 FL, when using a transmissive twisted nematic LCD screen. The slide switch 50 also is utilized as a brightness control switch and can be varied to vary the applied power from about 0.3 to 3 watts for portable PC applications to provide from about 20 FL to about 250 FL at the diffuser surface. The tube 34 can be driven up to about 16 watts to provide up to 3000 FL at the diffuser surface. The screen light readings are taken at the surface of the diffuser 48. Although the tube 34 can be driven up to 10,000 FL and above, the light from the tube 34 travels first through the LCD screen 44 and then through the diffuser 48. The amount of light transmitted varies with the type of LCD screen and the type of diffuser utilized. Utilizing the Plexiglass diffuser specified above, a segmented direct driven LCD screen transmits about one-half the light from the tube 34. A multiplexed twisted nematic LCD screen transmits about one-fourth of the light and a twisted nematic LCD screen driven by an active matrix transmits about one-third of the light. A dichroic LCD screen cannot be effectively multiplexed and transmits about eighty percent of the light in either an active matrix or direct drive mode. The tube 34 can be driven to about 10,000 FL, which is too bright for a viewer to look at directly. The invention thus provides a thin profile LCD screen which is truly a CRT look-a-like.

Modification and variation of the present invention are possible in light of the above teachings. Although it is preferable to utilize a single neon tube 24 or 34, it still can be advantageous to utilize more than one tube for some applications. Clearly such uses, such as two L-shaped tubes instead of the single tube 24 are contemplated by the present invention. Further, the location of the printed circuit board 42 as well as other necessary boards depend upon the configuration of the PC as well as the type of LCD screen utilized. It is therefore to be understood that within the scope of the appended claims, the invention may be practiced otherwise than as specifically described.

What is claimed and desired to be secured by Letters Patent of the United States is:

1. A method of illuminating flat panel display screens, comprising:
   providing a liquid crystal display screen having a predetermined configuration with a front and a back side;
   forming a neon tube with at least one bend therein to accommodate at least a portion of said screen configuration;
   placing said tube adjacent said screen configuration on the front side thereof to front light said screen; and
   activating said tube to illuminate said screen.

2. The method as defined in claim 1 including forming said screen in a rectangular configuration and forming said tube in a rectangular shape larger than said screen configuration and placing said tube adjacent and surrounding said screen rectangular configuration.

3. The method as defined in claim 1 including covering said tube to project light across the front of said screen without said tube directly being seen by a viewer of said screen.

4. An apparatus for illuminating flat panel display screens, comprising:
   a liquid crystal display screen having a predetermined configuration with a front and a back side;
   a neon tube formed with at least one bend therein to accommodate at least a portion of said screen configuration;
   said tube placed adjacent said screen configuration on the front side thereof to front light said screen; and
   means for activating said tube to illuminate said screen.

5. The apparatus as defined in claim 4 including said screen formed in a rectangular configuration and said tube formed in a rectangular shape larger than said screen configuration and said tube placed adjacent and surrounding said screen rectangular configuration.

6. The apparatus as defined in claim 4 including means for covering said tube to project light across the front of said screen without said tube directly being seen by a viewer of said screen.

7. An improved portable computer including a liquid crystal display screen attached thereto for displaying information thereon in the form of characters or other screen segments, said improvement comprising:
   the liquid crystal display screen having a predetermined configuration with a front and a back side;
   a neon tube formed with at least one bend therein to accommodate at least a portion of said screen configuration;
   said tube placed adjacent said screen configuration on the front side thereof to front light said screen; and
   means for activating said tube to illuminate said screen.

8. The improvement as defined in claim 7 including said screen formed in a rectangular configuration and said tube formed in a rectangular shape larger than said screen configuration and said tube placed adjacent and surrounding said screen rectangular configuration.

9. The improvement as defined in claim 7 including means for covering said tube to project light across the front of said screen without said tube directly being seen by a viewer of said screen.

10. The improvement as defined in claim 7 wherein the computer includes a closeable lid with said screen and said tube mounted therein.

* * * * *